United States Patent [19]

Bibik, Jr.

[11] Patent Number: 4,892,138
[45] Date of Patent: Jan. 9, 1990

[54] BEVERAGE TEMPERATURE CONTROLLING ASSEMBLY FOR A VEHICLE

[76] Inventor: Frank F. Bibik, Jr., 7010 Sepulveda Blvd., #212, Van Nuys, Calif. 91405

[21] Appl. No.: 303,323

[22] Filed: Jan. 30, 1989

[51] Int. Cl.$^4$ ............... F28F 7/00; B60H 1/08; B60H 1/32
[52] U.S. Cl. ............... 165/80.1; 165/41; 62/244
[58] Field of Search ............... 165/41, 80.1; 62/239, 62/244

[56] References Cited

U.S. PATENT DOCUMENTS

| | | | |
|---|---|---|---|
| 3,410,337 | 11/1968 | Priest | 165/41 |
| 3,505,830 | 4/1970 | Koerner | 62/337 |
| 3,757,851 | 9/1973 | Marble | 165/41 |
| 3,916,639 | 11/1975 | Atkinson | 62/239 |
| 4,478,052 | 10/1984 | McDowell | 62/244 |
| 4,653,289 | 3/1987 | Hodgetts | 62/239 |

Primary Examiner—Martin P. Schwadron
Assistant Examiner—Allen J. Flanigan
Attorney, Agent, or Firm—John J. Posta, Jr.

[57] ABSTRACT

The beverage temperature controlling assembly includes a vehicle dashboard of special construction. The dashboard includes an air duct below the top of the dashboard and leading from a heater and/or air conditioner to an exhaust vent in the of the dashboard. The assembly also includes in one embodiment a top dashboard lid permitting access to the air duct for storage of beverage containers therein. In another embodiment, the assembly includes a drawer slideably received in the dashboard in line with the duct and bearing the vent. The drawer has an open top, front and back and can be slid rearward to a beverage container-loading position in front of the dashboard and then slid back adjacent the duct in the dashboard. In another embodiment, the dashboard has a front beverage container-supporting ledge directly below and behind the vent. The ledge may have a vertically slideable sleeve or rim for temporarily enclosing the sides and front of a beverage container to assure full circulation therearound. A can caddy with open top, front and back and closed sides and bottom can be positioned on the ledge, in the duct and in the drawer.

8 Claims, 3 Drawing Sheets

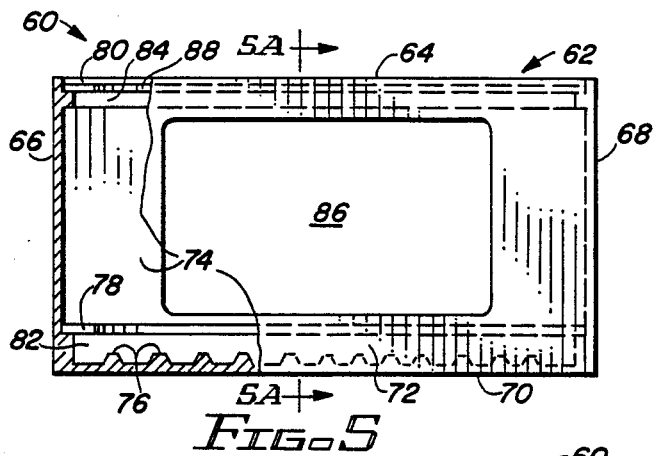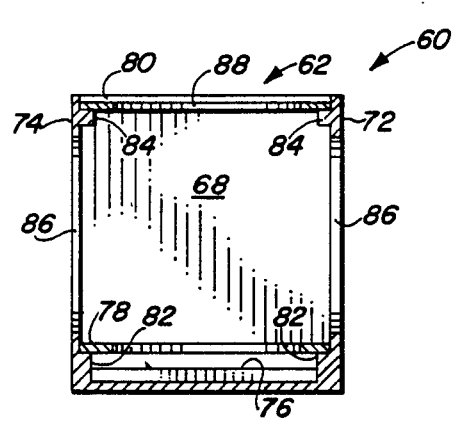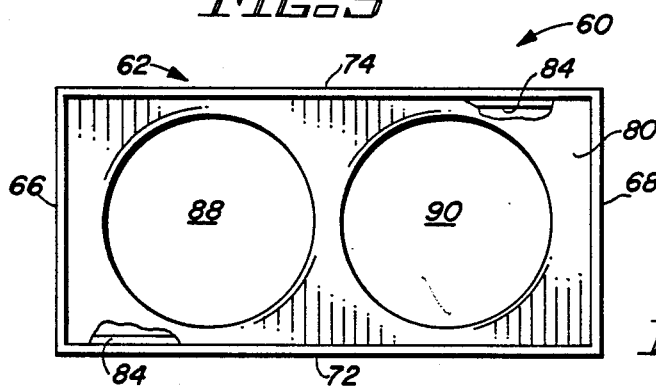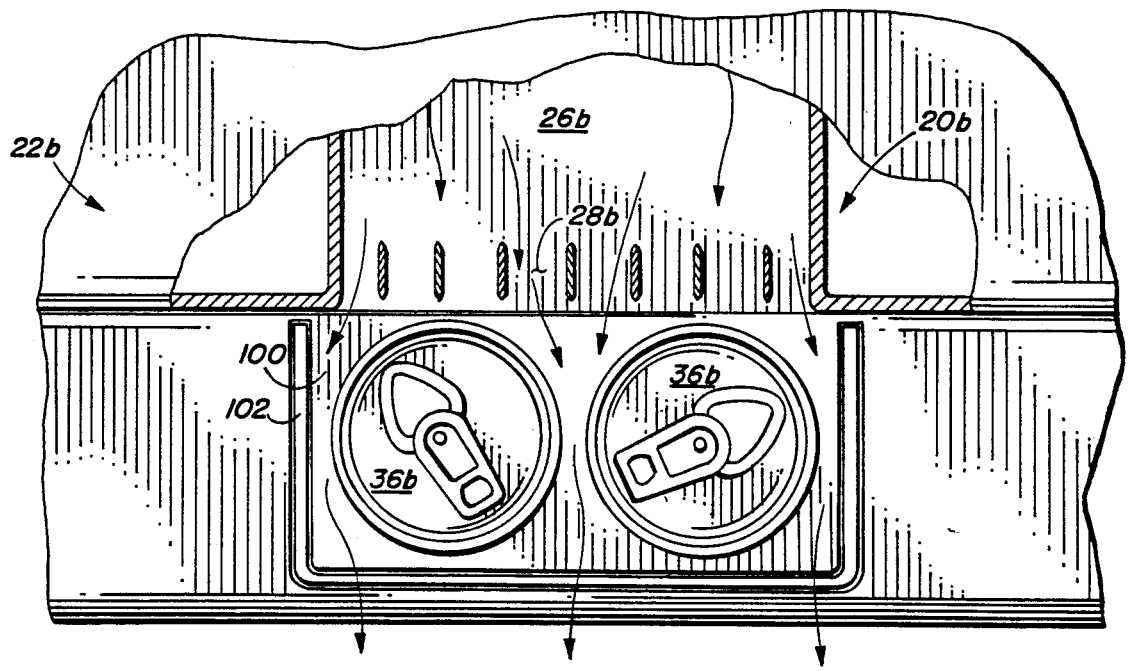

BEVERAGE TEMPERATURE CONTROLLING ASSEMBLY FOR A VEHICLE

BACKGROUND OF THE INVENTION

1. Field of the Invention

The present invention generally relates to beverage temperature regulators and more particularly to beverage temperature controlling assemblies for vehicles.

2. Prior Art

Many vehicle drivers and passengers enjoy drinking hot and cold beverages while motoring to business, while on vacations, etc. Usually, the beverage is in a disposable can or cup and unless it is consumed rapidly it rather quickly reaches room temperature and becomes unpalatable. Certain expensive insulated beverage cups are on the market and are used for such purposes, but once they are opened so that drinking can commence, they result in a rapid change in the beverage temperature towards ambient temperature and are not much improved over the disposable types of beverage containers.

There remains a need for a simple, inexpensive, durable and efficient device which will permit beverages when carried opened and unopened in a vehicle to be maintained over long periods of times at a desired temperature for optimal drinking. Such device preferably should allow the beverage to be carried opened but safely without danger of spilling. The device should be adaptable to a variety of modes and be capable of being incorporated permanently in the vehicle.

SUMMARY OF THE INVENTION

The improved beverage temperature controlling assembly for a vehicle satisfies all the foregoing needs. The assembly is substantially as set forth in the Abstract of the Disclosure.

Thus, the assembly includes a vehicle dashboard of special construction. The dashboard has the usual horizontal air duct running through it interconnecting the air vent(s) in the vehicle's dashboard with the vehicle's air temperature conditioning unit, whether it be a heater or a combined heater and cooling unit.

The dashboard is specially modified to include (a) an openable top lid affording direct access to the dashboard air duct in which the beverage container(s) can then be inserted, or (b) a front drawer with open top, front and rear in line with the air duct inside the dashboard and slideable to a position rearwardly thereof for insertion of beverage container(s) therein, or (c) a front outside ledge directly below the air vent, upon which the beverage container(s) can be seated. A U-shaped rim or sleeve can be incorporated into the ledge and can be temporarily slid vertically up around the container(s) to enclose the same for full circulation of air from the vent therearound. Moreover, a beverage container caddy can be included in the assembly, which caddy may hold one or more beverage containers in a frame having closed sides and bottom, an open top, front and rear (for free flow of air from the duct therethrough) and one or more horizontal container-holding plates therein.

Beverage temperature containers while in the assembly are easily controlled and maintained by regulating the temperature of the air passing from the duct to the front air vent from the air temperature conditioning unit. For example, a can of soda, fruit juice or a bottle of water can easily be kept cold by the air temperature conditioning unit, since the air from the unit can be very low, e.g., 40-50 F. and will impinge directly on the can before it exits the assembly. Once the air circulates in the vehicle interior, it greatly increases in temperature toward ambient temperature. Since the air flow can be left on as long as desired, the drink will stay cold until fully consumed.

Similarly, the heating component of the air temperature conditioning unit will easily maintain a cup of coffee hot, since that air can be 100+°.

Normally, cool drinks are consumed in warm weather and hot drinks in cold weather, so that the vehicle air temperature conditioning unit will be performing its normal cooling or warming function for the motorist(s) while keeping the beverage cool or hot. The assembly also keeps the beverage safe against spilling and readily accessible to the driver and front passengers. The assembly also takes up little or no additional room.

Various other aspects of the present invention are set forth in the following detailed description and accompanying drawings.

DRAWINGS

FIG. 5 is a reduced size schematic rear elevation, partly broken away, of a preferred embodiment of a container caddy usable in and forming part of the present assembly;

FIG. 6 is a reduced size schematic top plan view of the caddy of FIG. 5;

DETAILED DESCRIPTION

FIGURES 1 & 2.

Figure 1:
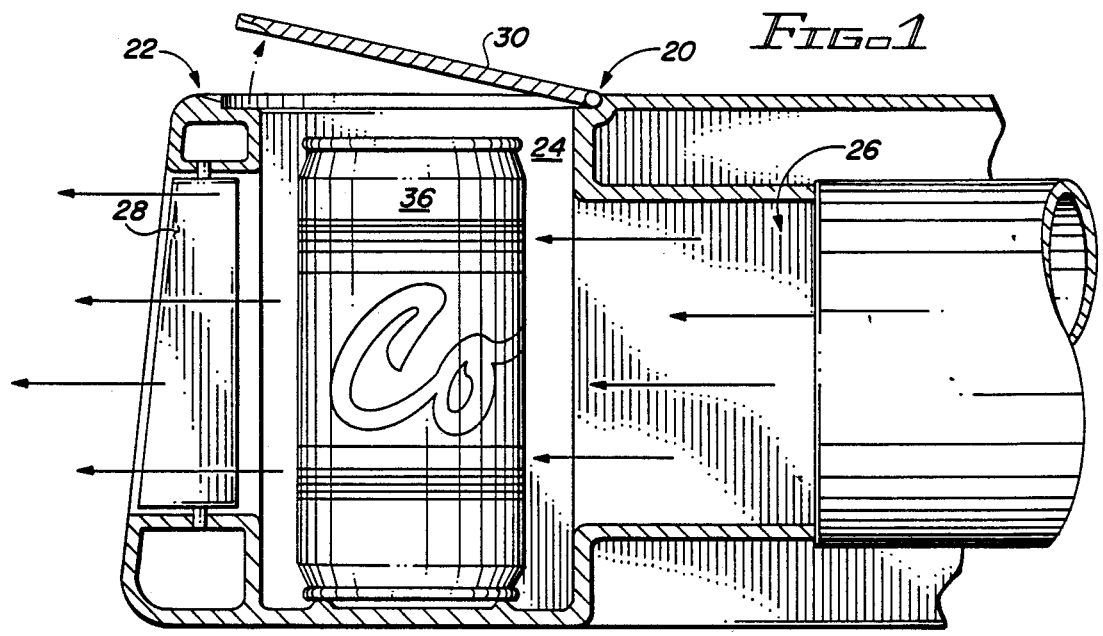
FIG. 1 is a schematic fragmentary side elevation, partly in section, of a first preferred embodiment of the improved beverage temperature controlling assembly of the present invention.
Figure 2:
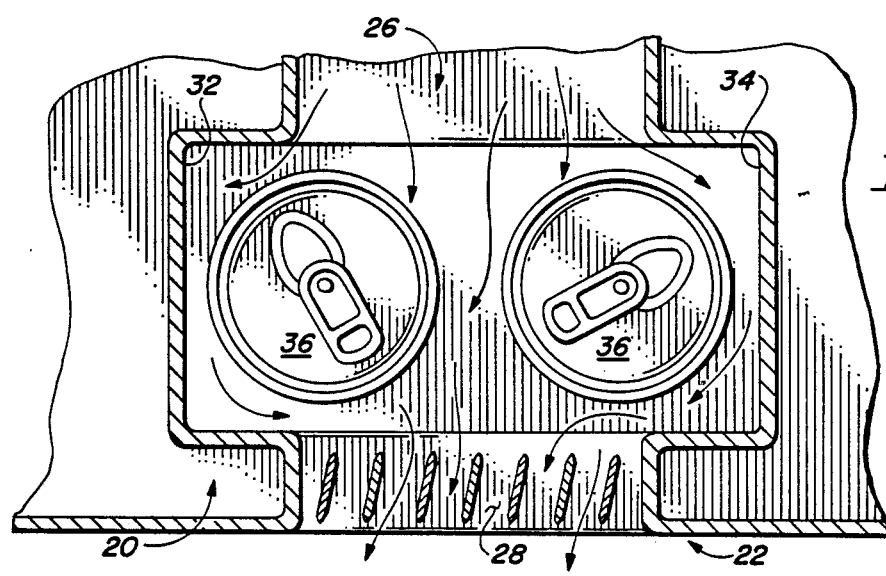
FIG. 2 is a reduced size schematic fragmentary horizontal section of the assembly of FIG. 1 with the lid thereof removed.

Now referring more particularly to FIGS. 1 & 2 of the drawings, a first preferred embodiment of the improved beverage temperature controlling assembly of the present invention is schematically depicted therein. Thus, assembly 20 is shown, which comprises a vehicle dashboard 22 specially modified to include a vertical access tunnel 24 down to a conventional horizontal duct 26 extending from an air temperature controlling device, whether it be a heat or cooling unit or both (not shown). Duct 26 passes forward to a air vent 28 in the of dashboard 22. Tunnel 24 is covered by a hinged top lid 30 on the top of dashboard 22. Duct 26 may be widened to include extended sides 32 & 34 (FIG. 2), if desired, so that a larger number of beverage cans 36 may be stored therein.

With this arrangement, cans 36 are passed into and out of duct 26 through tunnel 24 after raising lid 30. Cans 36 while in duct 26 are kept hot or cold or any temperature in between by controlling the temperature of air passing from the air temperature regulating unit through duct 26 and out vent 28 into the passenger compartment of the vehicle. Cans 36 while stored in duct 26 are kept safe from spilling, from flies, etc., yet are readily accessible.

The modifications to dashboard 22 can be made easily and rapidly with conventional materials to provide the desired results.

FIGURES 3 & 4

Figure 3:
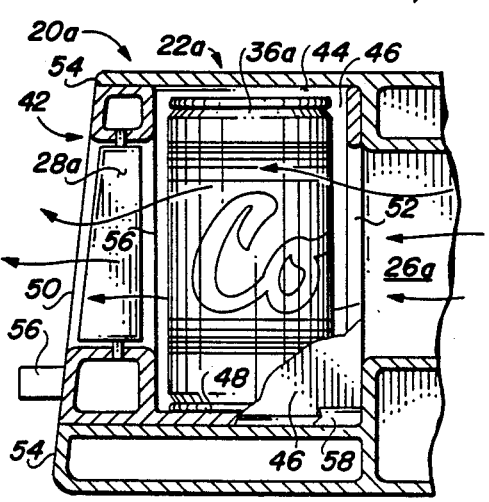
FIG. 3 is a schematic fragmentary side elevation, partly in section and partly broken away, of a second preferred embodiment of the improved beverage temperature controlling assembly of the present invention, shown with the drawer thereof in the closed position.
Figure 4:
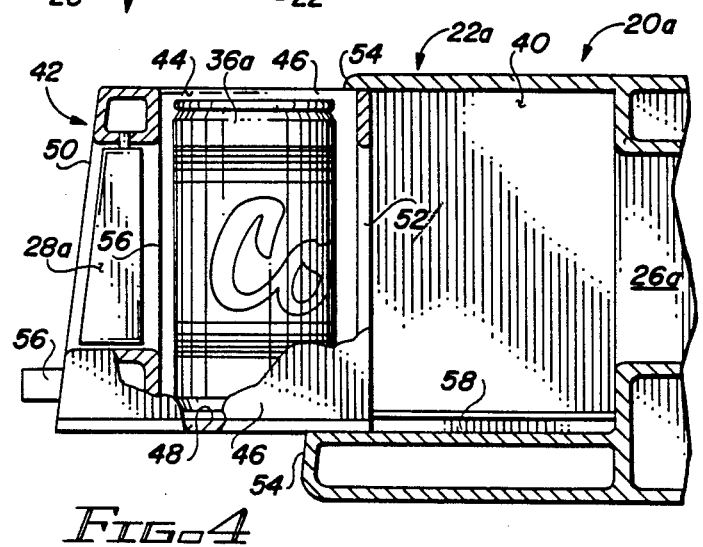
FIG. 4 is a schematic fragmentary side elevation, partly in section, of the assembly of FIG. 3, shown with the drawer thereof slid forward and opened.

A second preferred embodiment of the improved assembly of the present invention is schematically depicted in FIGS. 3 & 4. Thus, assembly 20a is shown. Components thereof similar to those of assembly 20 bear the same numerals but are succeeded by the letter "a".

Assembly 20a is identical to assembly 20, except as follows:
  (a) duct 26a is expanded at the portion 40 thereof to accommodate a drawer 42 having an open top 44, closed sides 46, bottom 48 and front 50 and open rear 52. Front 50 bears vent 28a so that air flows freely from the duct 26a through drawer 42 and out vent 26a, thus controlling the temperature of beverage cans 36a which may be stored in drawer 42;
  (b) there is no top lid or tunnel; instead, the face 54 of dashboard 22a is cut away to enable drawer 42 to be slid by attached knob from the position shown in FIG. 3, along tracks 58 built into the bottom sides of front portion 40 to the position shown in FIG. 4. In the latter position, beverage cans 36a can be loaded into and taken from drawer 42 before sliding it back into dashboard 22a to close dashboard 22a.

Assembly 20a has substantially the same advantages as assembly 20.

FIGURES 5 & 6

A beverage can caddy useful in and forming an optional part of the assembly of the present invention is schematically depicted in FIGS. 5 & 6. Thus, caddy 60 is shown which comprises a box 62 with open top 64, closed sides 66 & 68, closed bottom 70, open rear 72 and open front 74. Cross pieces 76 on bottom 70 can support beverage cans (not shown) above bottom 70 for better circulation. A pair of spaced horizontal can support plates 78 & 80 are supported one above the other on horizontal rails 82 & 84, respectively, affixed to the inner surface of sides 66 & 68, front 74 and rear 72, below and above rectangular openings 86 in front 74 and rear 72. Plates 78 & 80 each may include a pair of vertical openings 88 & 90 therethrough in which beverage cans (not shown) may be supported.

Caddy 60 can be inserted in drawer 42 or duct 26, as desired, to render easier the handling of cans 36 as a group. Openings 86 allow free passage of air into caddy 60, around cans 36 therein and out of caddy 60 for full use of the present assembly. Caddy 60 can be of metal, wood, plastic, paperboard or the like.

FIGURES 7, 8 & 9

Figure 7:
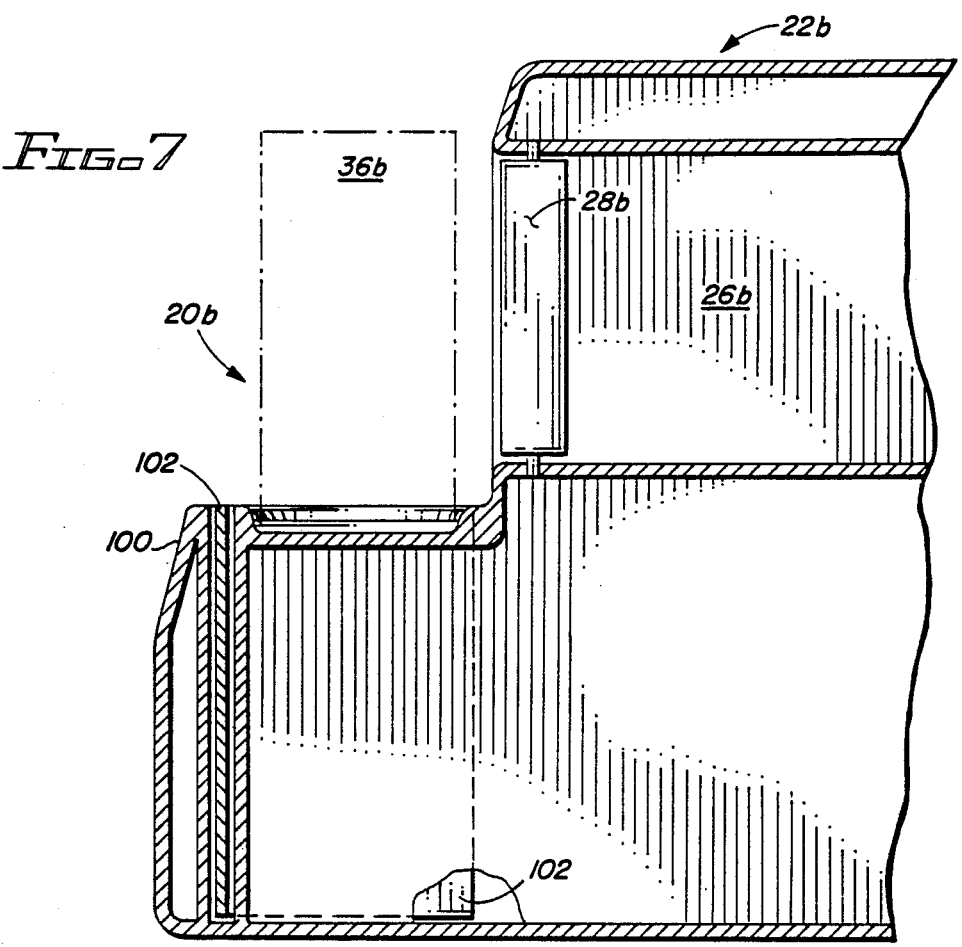
FIG. 7 is a schematic side elevation, partly in section, of a third preferred embodiment of the improved beverage temperature controlling assembly of the present invention, shown with the protective sleeve thereof retracted.
Figure 8:
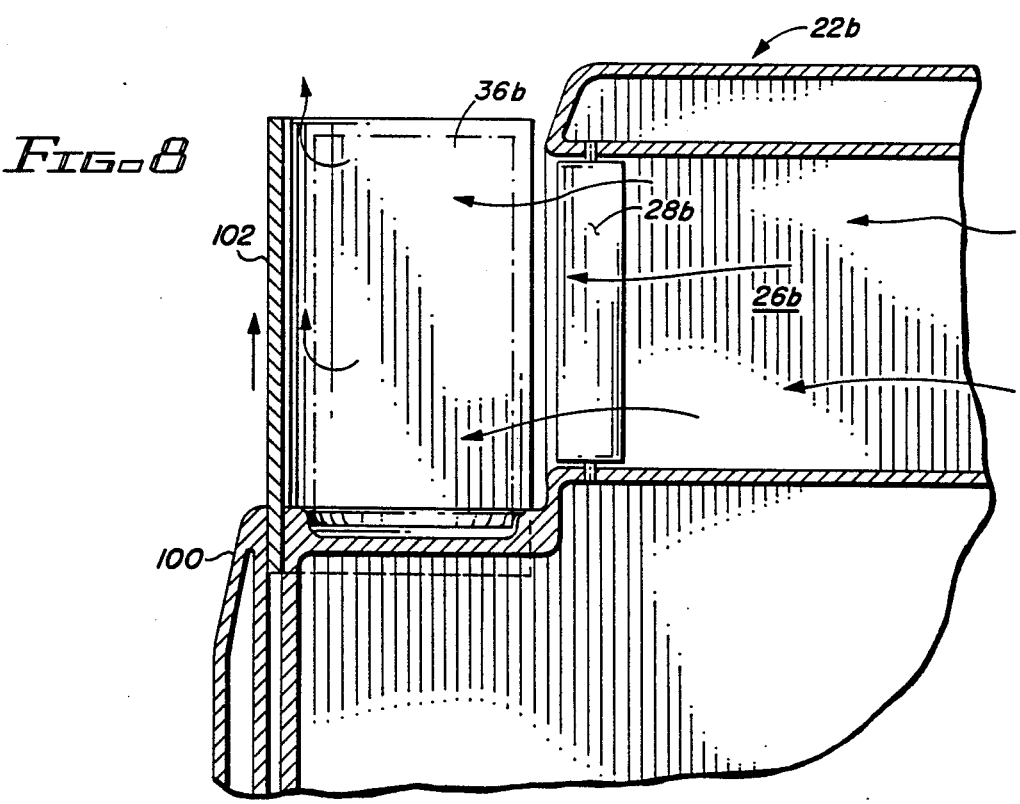
FIG. 8 is a schematic side elevation, partly in section, of the assembly of FIG. 7, shown with the protective sleeve thereof raised; and, FIG. 9 is a schematic top plan view, partly in section, of the assembly of FIG. 7.

A third preferred embodiment of the improved assembly of the present invention is schematically depicted in FIGS. 7, 8 & 9. Thus, assembly 20b is shown. Components thereof similar to those of assembly 20 bear the same numerals but are succeeded by the letter "b".

Assembly 20b differs from assembly 20 only as
  (a) there is no top lid or tunnel; instead, dashboard 22b is provided with an integral front shelf 100 immediately in front of and below vent 28b, upon which one or more beverage cans 36b may be supported for keeping them hot, cool, etc., by air from vent 28b; and,
  (b) a vertically moveable sleeve or rim 102, U-shaped in plan view, may be tightly slideably received over the front and sides of shelf 100, for movement between the lower storage position of FIGS. 7 & 9 below the top of shelf 100 and the upper operative position of FIG. 8 in which it extends above the front and sides of shelf 100, thus enclosing the front and sides of can 36b and allowing full circulation of air from vent 28b therearound and up and out therefrom for optimal temperature regulation. Sleeve 102 may be of wood, plastic, metal, etc.

Assembly 20b has substantially the advantages of assembly 20.

Various other modifications, changes, alterations and additions can be made in the improved assembly of the present invention, its components and parameters. All such changes, modifications, alterations and additions as are within the scope of the appended claims form part of the present invention.

What is claimed is:

1. An improved beverage temperature controlling assembly for a vehicle, said assembly comprising, in combination:
  (a) a dashboard containing an air duct below the top of said dashboard, said duct leading from a vehicle air temperature conditioning unit to an exhaust vent in said dashboard; and,
  (b) means integrally connected to said dashboard for releasably positioning a beverage container within said air duct to provide a circulation path around said container to cool or heat said container.

2. An improved beverage temperature controlling assembly for a vehicle, said assembly comprising, in combination:
  (a) a dashboard containing an air duct below the top of said dashboard, said duct leading from a vehicle air temperature conditioning unit to an exhaust vent in said dashboard; and,
  (b) means integrally connected to said dashboard for releasably positioning a beverage container within said air duct to provide a circulation path around said container to cool or heat said container,
  (c) wherein said dashboard has an openable lid providing access to said duct, said duct being dimensioned to releasably receive said beverage container within said dashboard.

3. The improved assembly of claim 2 wherein said lid is hinged to the top of said dashboard and wherein said assembly includes a beverage can caddy open at the front and back thereof to allow free passage of air therethrough.

4. An improved beverage temperature controlling assembly for a vehicle, said assembly comprising, in combination:
  (a) a dashboard containing an air duct below the top of said dashboard, said duct leading from a vehicle air temperature conditioning unit to an exhaust vent in said dashboard; and,
  (b) means integrally connected to said dashboard for releasably positioning a beverage container within said air duct to provide a circulation path around said container to cool or heat said container,
  (c) wherein said dashboard carries a drawer aligned with the front of said duct and slidable between a rear position within said dashboard and a forward position out of said dashboard, said drawer having a front end bearing said vent and a rear open end whereby air can freely pass forward from said duct through said drawer and out of said vent, said drawer having a closed bottom and open top and being adapted to releasably support at least one of said beverage containers therein.

5. The improved assembly of claim 4 wherein said drawer has a front pull knob and is adapted to receive a beverage container caddy.

6. An improved beverage temperature controlling assembly for a vehicle, said assembly comprising, in combination:
  (a) a dashboard containing an air duct below the top of said dashboard, said duct leading from a vehicle air temperature conditioning unit to an exhaust vent in said dashboard; and,
  (b) means integrally connected to said dashboard for releasably positioning a beverage container within said air duct to provide a circulation path around said container to cool or heat said container,
  (c) wherein said positioning means includes a ledge connected to said dashboard and extending directly below and in front of said vent, said ledge being adapted to support a beverage container in front of said vent to control the temperature thereof.

7. The improved assembly of claim 6 wherein said ledge has a sleeve which is generally U-shaped in top plan view slidably connected thereto for vertical movement between a lower storage position and an upper beverage container-enclosing position, said rim in said latter position extending around the sides and front of said container so as to assure full circulation of air from said vent therearound.

8. The improved assembly of claim 1 wherein said assembly includes a beverage can caddy open at the front, top and rear thereof to allow free passage of air therethrough, said caddy being closed at the bottom thereof and including at least one can-holding horizontal plate therein.

* * * * *